US009916382B1

(12) United States Patent
Clarke et al.

(10) Patent No.: US 9,916,382 B1
(45) Date of Patent: Mar. 13, 2018

(54) SYSTEMS AND METHODS FOR LINKING CONTENT ITEMS

(71) Applicant: Amazon Technologies, Inc., Seattle, WA (US)

(72) Inventors: Frederick Hughes Clarke, Bellevue, WA (US); Mike Iampietro, Seattle, WA (US); Aby Thomas Angilivelil, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 521 days.

(21) Appl. No.: 14/564,662

(22) Filed: Dec. 9, 2014

(51) Int. Cl.
*G06F 17/30* (2006.01)

(52) U.S. Cl.
CPC .. *G06F 17/30825* (2013.01); *G06F 17/30849* (2013.01)

(58) Field of Classification Search
CPC ......... G06F 17/30864; G06F 17/30321; G06F 17/30613
USPC ........ 707/741, 737, 706, 725; 715/206, 216; 386/230
See application file for complete search history.

(56) References Cited

U.S. PATENT DOCUMENTS

| | | | | |
|---|---|---|---|---|
| 8,131,545 B1 * | 3/2012 | Moreno | ................... | G10L 15/04 704/235 |
| 8,156,114 B2 * | 4/2012 | Byers | ................ | G06F 17/30038 707/725 |
| 8,904,271 B2 * | 12/2014 | Evans | ................ | G06F 17/30017 715/206 |
| 9,098,841 B2 * | 8/2015 | Evans | ................ | G06F 17/30017 |
| 9,578,379 B1 * | 2/2017 | Klappert | ............. | H04N 21/4756 |
| 9,703,781 B2 * | 7/2017 | Hwang | ............. | G06F 17/30014 |
| 2005/0138109 A1 * | 6/2005 | Redlich | ............. | G06F 17/30699 709/201 |
| 2007/0255565 A1 * | 11/2007 | Yu | ..................... | G06F 17/30038 704/251 |
| 2009/0303239 A1 * | 12/2009 | Ang | .................. | G06F 17/30554 345/440 |
| 2012/0236201 A1 * | 9/2012 | Larsen | ................. | H04N 21/235 348/468 |
| 2012/0315009 A1 * | 12/2012 | Evans | .................... | H04N 5/765 386/230 |
| 2013/0013991 A1 * | 1/2013 | Evans | .................... | H04N 5/765 715/206 |
| 2013/0055140 A1 * | 2/2013 | Mosquera | ............. | G06F 3/0483 715/776 |
| 2013/0334300 A1 * | 12/2013 | Evans | ............... | G06F 17/30017 235/375 |
| 2014/0281982 A1 * | 9/2014 | Clark | .................... | G06F 3/0481 715/716 |

(Continued)

*Primary Examiner* — Jeffrey A Burke
*Assistant Examiner* — Thong Vu
(74) *Attorney, Agent, or Firm* — Eversheds Sutherland (US) LLP

(57) ABSTRACT

Provided are systems and methods for determining a first subject of a first content item corresponding to a first storyline, determining a second subject of a second content item corresponding to a second storyline, determining first data associated with the first subject, determining second data associated with the second subject, comparing at least a portion of the first data to at least a portion of the second data, determining that the first subject is related to the second subject, and associating the first content item with the second content item.

20 Claims, 7 Drawing Sheets

(56) References Cited

U.S. PATENT DOCUMENTS

2015/0067459 A1     3/2015   Lester
2015/0135059 A1*   5/2015   Liang ................. G06F 17/2247
                                                                                                                              715/234

* cited by examiner

| Content Item | Subjects of Content Items |
|---|---|
| movie "Battle" | S1a; S2a; S3a; S4a; S5a; S6a; S7a; S8a |
| e-book "Battle of Time" | S1b; S3b; S2b; S6b; S7b; S9b; S10b |
| movie "Battle – Uncut" | S1c; S2c; S3c; S4c; S5c; S6c; S7c; S8c; S9c; S11c |
| "Battle wiki page" | S5d |
| movie "Battling Foes" | S20e; S21e; S22e; S23e; S24e |

*FIG. 5A*

| Subject | Companion Subjects |
|---|---|
| S1a | S1b; S1c |
| S2a | S2b; S2c |
| S3a | S3b; S3c |
| S4a | S4b |
| S5a | S5b; S5d |

*FIG. 5B*

| Content Item | Companion Content Items |
|---|---|
| movie "Battle" | e-book "Battle of Time"; movie "Battle – Uncut"; "Battle wiki page" |
| e-book "Battle of Time" | movie "Battle"; movie "Battle – Uncut" |
| movie "Battle – Uncut" | movie "Battle"; e-book "Battle of Time"; "Battle wiki page" |
| "Battle wiki page" | movie "Battle"; e-book "Battle of Time"; movie "Battle – Uncut" |
| movie "Battling Foes" | |

*FIG. 5C*

SYSTEMS AND METHODS FOR LINKING CONTENT ITEMS

BACKGROUND

Users are able to view, or otherwise experience, content through a variety of mediums, such as movies, books, electronic books, audio books, videos, television programs, songs, computer and video games, multi-media content, and the like. For example, a user may watch a movie on a computer, or read an electronic book ("e-book") on an electronic book reading device ("e-reader"). In some instances, different content ("content items") can be related to one another. For example, a book and a movie based on the book may be related to the same storyline. Related content items are sometimes referred to as "companion" content items. For example, the movie based on a book may have companion items that include the book, an e-book version of the book, another "uncut" version of the movie that extends the storyline, a video game based on the movie, a webpage describing a character in the movie, and so forth.

BRIEF DESCRIPTION OF THE DRAWINGS

FIG. 5A is a table that illustrates a content item subject index in accordance with one or more embodiments.

FIG. 5B is a table that illustrates a subject linking index in accordance with one or more embodiments.

FIG. 5C is a table that illustrates a content item linking index in accordance with one or more embodiments.

Figure 1:
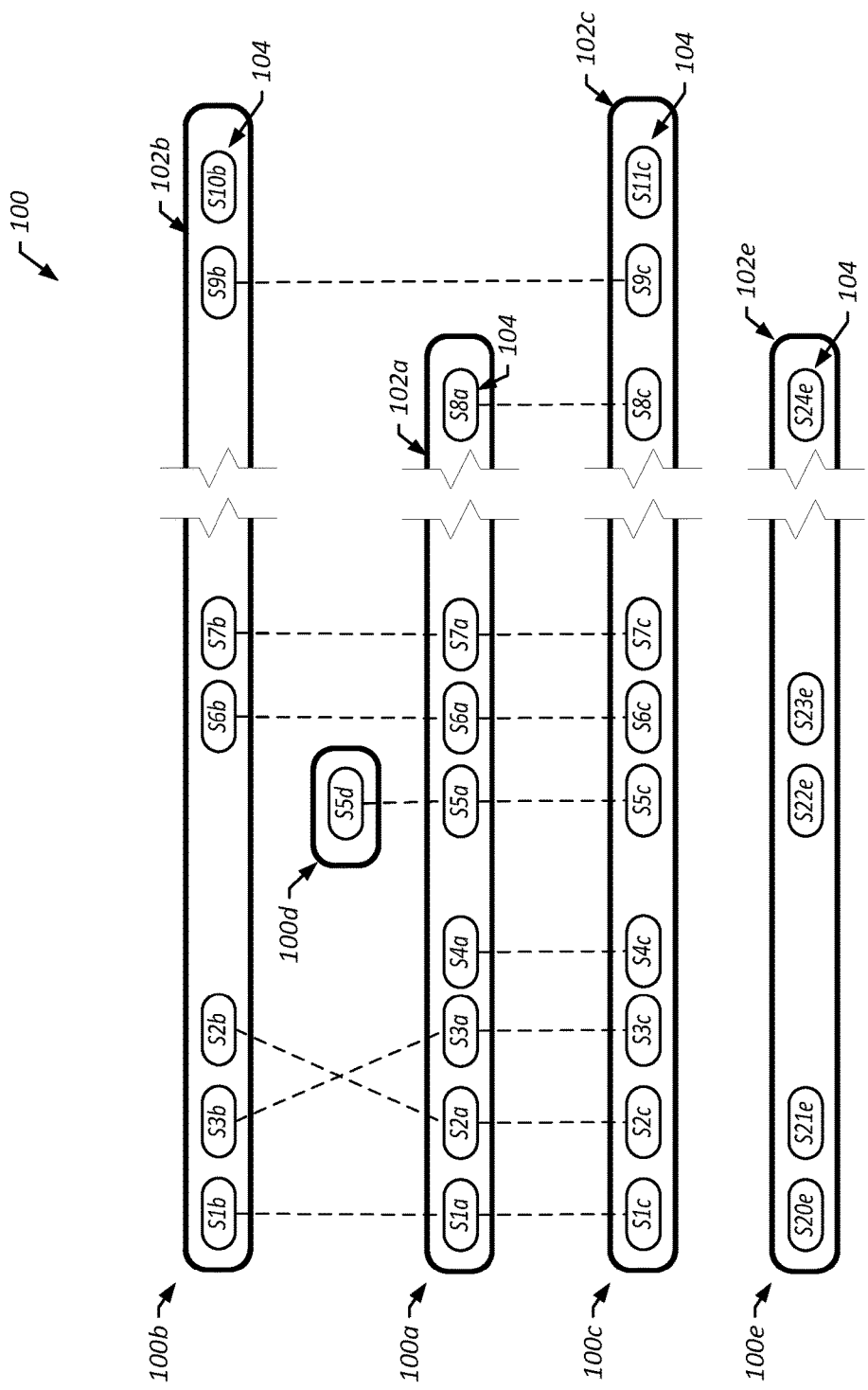
FIG. 1 is a diagram that illustrates a set of content items in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and the detailed description thereto are not intended to limit the disclosure to the particular form disclosed, but to the contrary, the intention is to cover all modifications, equivalents, and alternatives falling within the spirit and scope of the present disclosure as defined by the appended claims.

DETAILED DESCRIPTION

Described herein are systems and methods for linking (or otherwise associating) related content. In some embodiments, a content item related to a storyline may be linked, or otherwise associated with, one or more other content items related to the same storyline or a similar storyline. For example, a movie based on a book may be linked to the book, a comic book based on the book, an e-book version of the book, another movie extending the storyline, a video game based on the movie, a webpage describing the movie, and so forth. In some embodiments, subject matter (also referred to as a "subjects" or "features") within related content items can be linked. For example, a scene of the movie may be linked to a related chapter of the book. A subject (or feature) may include any topic of interest within, or otherwise significant to, a content item. Thus, for example, a subject may include a person, an object or an event that is addressed by the content item. With regard to a movie, for example, a subject may include a scene, a character, an event, an object or the like of the movie. With regard to a book, a subject may include, for example, a chapter, a page, a character, an event, an object or the like described by the e-book. It will be appreciated that content can be presented in a variety of suitable formats. For example, movies may be presented in a video format (e.g., including playback on an electronic display along with corresponding audio), e-books may be presented in a textual format (e.g., including electronic display of the written text of the book), audio books may be presented in an audio format (e.g., a spoken reading of the book, played via a speaker). A movie, may, for example, include an ordered series of scenes (e.g., a first scene, a second scene, and so forth). An e-book may, for example, include an ordered series of chapters (e.g., a first chapter, a second chapter, and so forth).

The identified links between content, whether between content items or subjects within content items, can be used to notify users of related content items and subjects. Moreover, the links can be used to encourage and to enable users to navigate between related or "companion" content. In some embodiments, the linking of companion content can include identifying a link, or a relationship, between different content items and/or identifying links, or relationships, between particular subject matter of the different content items. For example, linking the movie "Battle" and the e-book "Battle of Time" may include linking the movie and the e-book generally, as well as linking particular subjects of the movie "Battle" (e.g., a scene, a character, an event, an object or the like of the movie "Battle") to corresponding subjects of the e-book "Battle of Time" (e.g., a chapter, a page, a character, an event, an object or the like described in the e-book "Battle of Time"). In some embodiments, a linking process can include identifying content items, identifying subject matter (or "subjects") within the content items, comparing the subjects to identify companion content (e.g., companion subjects and/or companion content items), and linking the companion content (e.g., linking the companion subjects and/or the companion content items). With regard to the movie "Battle" and the e-book "Battle of Time," for example, the movie and the e-book may be indexed to identify subjects within the movie (e.g., scenes, characters, events, objects or the like addressed by the movie) and the e-book (e.g., chapters, pages, characters, events, objects or the like described in the e-book). In some embodiments, additional information for the identified subjects can be collected (e.g., additional information for each of the subjects can be extracted from the content associated with the subjects, or gathered from other sources, such as users). The subjects (including the information corresponding thereto) may, then, be compared to one another to identify which, if any, of the identified subjects are related to one another. If two subjects are related, they may be linked to one another. For example, if scene I of the movie "Battle" relates to a chapter I of the e-book "Battle of Time," a subject index can be updated to reflect the relationship, or link, between the scene and the chapter. In some embodiments, content items as a whole can be linked based on the linking of subjects of the content items. For example, the movie "Battle" and the e-book "Battle of Time" may be linked based on a subject of the movie (e.g., scene I of the movie) being linked to a subject of the e-book (e.g., chapter I of the e-book). Thus, despite the fact that two content items do not share the exact same storyline, the two content items and their subjects can be linked, or otherwise associated, with one another. For example, despite the fact the movie "Battle" and the e-book "Battle of Time" do not share the exact same storyline (e.g., scenes and chapters address different subject matter, subject matter is presented in different sequences, the movie or the e-book may include subject matter that the other content item does not have, and so forth), the movie and the e-book may be linked based on related, or companion, subject matter. That is, for example, the movie "Battle" and the e-book "Battle of Time" may be linked based on at least some similarities between scenes, characters, and/or other portions of their storylines.

In some embodiments, the presentation of a content item, or a portion or subject thereof, may be supplemented with linking content that can inform a user about the existence of companion content. For example, during playback of the opening credits of the movie "Battle," linking content (e.g., a pop-up dialogue) may be displayed to inform the viewer that the movie is related to the e-book "Battle of Time." As a further example, during playback of a particular portion of the movie (e.g., a scene, a character, an event, an object or the like of the movie) addressing a subject linked to a subject of the e-book, linking content (e.g., a pop-up dialogue) may be displayed to inform the user that the subject of the movie is related to a subject of the e-book (e.g., the subject of the movie is related to a chapter, a page, a character, an event, an object or the like described by the e-book). With regard to the movie "Battle," for example, playback of scene I in the movie "Battle" may be accompanied by a pop-up dialogue that states "This Scene is related to Chapter I of the e-book Battle of Time." Similarly, a display of portions of the e-book may be accompanied by linking content (e.g., a pop-up dialogue or hyperlink in the text of the e-book) that informs the reader that the e-book is related to the movie, that a particular subject of the e-book (e.g., a chapter, a page, a scene, a character, an event, an object or the like) is related to a subject of the movie (e.g., the subject of the e-book is related to a scene, a character, an event, an object or the like of the movie). With regard to the e-book "Battle of Time, for example, a display of the first page of chapter I of the e-book "Battle of Time" may be accompanied by a pop-up dialogue that states "This Chapter is related to Scene I of the movie Battle."

In some embodiments, the linking content can enable a user to navigate to the referenced companion content. In the context of the above examples related to the playback of the movie "Battle," a pop-up dialogue that states "This Scene is related to Chapter I of the e-book Battle of Time" (e.g., displayed during playback of the first scene in the movie) may include a hyperlink that, when selected, navigates to, or otherwise directs the user to, chapter I of the e-book "Battle of Time." Similarly, in the context of the above examples related to displaying chapter I of the e-book "Battle of Time," a pop-up dialogue that states "This Chapter is related to Scene I of the movie Battle" may include a hyperlink that, when selected, navigates to, or otherwise directs the user to, the playback of scene I of the movie "Battle."

Although certain embodiments are described with regard to particular content mediums, or formats (e.g., movies and e-books) for the purpose of illustration, similar embodiments may be employed for any variety of content mediums, such as books, electronic books (or "e-books"), audio books, comic books, videos, television programs, songs, computer and video games, multi-media content, and/or the like.

FIG. 1 is a diagram that illustrates a set of content items 100 in accordance with one or more embodiments. In the illustrated embodiment, the set of content items 100 may include a first content item 100a, a second content item 100b, a third content item 100c, a fourth content item 100d, and a fifth content item 100e. In some embodiments, the first content item 100a may correspond to the movie "Battle," the second content item 100b may correspond to the e-book "Battle of Time," the third content item 100c may correspond to the movie "Battle—Uncut" (e.g., including additional scenes not available in the movie "Battle"), the fourth content item 100d may correspond to a network content page (e.g., a "Battle wiki page") including information about the movie "Battle," and the fifth content item 100e may correspond to a movie "Battling Foes." The movie "Battling Foes" may be unrelated to the movie "Battle" and the other content items 100 (e.g., content item 100e may be unrelated to content items 100a-100d).

Each of the content items 100 may be composed of one or more subject matter elements ("subjects") 104 (denoted by SN). Notably, in some embodiments, subjects SN with a similar numeric designation ("N") may be related. For example, the subject S4a may be related to the subject S4c. This notation is used for the convenience of the reader. Some of the content items 100 may be represented by a storyline. For example, the first, second and third content items 100a, 100b and 100c are represented by storylines 102a, 102b and 102c, respectively. A storyline may be composed of two or more subjects 104. For example, the first storyline 102a includes subjects S1a-S8a, the second storyline 102b includes the subjects S1b-S3b, S6b, S7b, S9b and S10b, and so forth. In some embodiments, a storyline for a content item 100 may represent arrangement of the subjects 104 in sequential order (e.g., a timeline reflecting when the subjects 104 occur in the storyline 102, relative to a time and/or other subjects 104 of the storyline). With regard to the first content item 100a for the movie "Battle," for example, the storyline 102a may include the subjects S1a-S8a in sequential order based on where they are addressed in the movie. For example, the subjects S1a, S2a and S3a may correspond to the first three scenes of the movie, the subject S4a may correspond to a battle event that occurs during the third scene of the movie, the subject S5a may correspond to a "Soldier" character that appears in the third scene of the movie, the subject S6a may correspond to fourth scene in the movie, the subject S7a may correspond to an object, e.g., a sword, that appears in the fourth scene of the movie, and the subject S8a may correspond to a final scene of the movie. A similar arrangement may be provided for the other content items 100. With regard to the second content item 100b (e.g., the e-book "Battle of Time" 100b), for example, the subjects S1b, S3b, S2b and S6b of its storyline 102b may correspond to the first four chapters of the e-book, the subject S7b may correspond to an object, e.g., a sword, that appears in the fourth chapter of the e-book, the subject S9b may correspond to the last chapter of the e-book, and the subject S10b may correspond to a kiss event that occurs between the "Soldier" character and his love interest during the last chapter of the e-book. With regard to the third content item 100c (e.g., the movie "Battle—Uncut" 100c), for example, the subjects S1c-S8c of its storyline 102c may be the same or similar to the subjects S1a-S8a of the movie "Battle," but it may also include the subject S9c corresponding to an additional scene in the movie "Battle—Uncut," and a subject S11c that corresponds to an escape of the "Soldier" character in the final scene of the movie "Battle—Uncut" 100c. The subject S9c (e.g., an additional scene in the movie "Battle—Uncut" 100c) may correspond to the subject S9b (e.g., the last chapter of the e-book "Battle of Time" 100b). With regard to the fourth content item 100d (e.g., the "Battle wiki page" 100d), it may include the subject S5d corresponding to a description of the "Soldier" character that appears in the third scene of the movie "Battle" 100a and the third scene of the movie "Battle—Uncut" 100c.

Notably, the content and the storylines of each of the different content items 100 may be similar in some respects, but different in others. For example, the storylines 102 for the movie "Battle" 100a and the e-book "Battle of Time" 100b diverge, or are different, at least with respect to the following: (1) the order of the subjects S2a and S3a relative to S3b and S2b (e.g., the order of the chapters III and II in the e-book are reversed with respect to the corresponding scenes 2 and 3 of the movie); (2) the e-book does not include subject matter corresponding to S4a, S5a, or S8a (e.g., the e-book does not include a battle event that occurs during the third scene of the movie, a "Soldier" character that appears in the third scene of the movie, a sword that appears in the fourth scene of the movie, or subject matter corresponding to the final scene of the movie); and (3) the e-book includes subjects S9b and S10b not present in the movie (e.g., the movie does not include subject matter that corresponds to the last chapter of the e-book, and does not include subject matter relating to the kiss event that occurs between the "Soldier" character and his love interest during the last chapter of the e-book). As an additional example, the storylines 102 for the movie "Battle" 100a and the movie "Battle—Uncut" 100c diverge, or are different, at least with respect to the additional subject matter S9c and S11c of the movie "Battle—Uncut" 100c (e.g., the movie "Battle—Uncut" 100c includes an additional/final scene (S9c) that includes an escape of the "Soldier" character (S11c)).

As described herein, in some embodiments, the linking of companion content can include identifying links, or relationships, between the subjects 104 of the content items 100. For example, the subjects S1a, S2a S3a, S6a and S7a of the movie "Battle" 100a may be linked to corresponding subjects S1b, S3b, S2b, S6b and S7b, respectively, of the e-book "Battle of Time" 100b (e.g., as depicted by the dashed lines of FIG. 1 extending between the respective pairs of subjects 104). Further, as described herein, in some embodiments, the linking of companion content can include identifying links, or relationships, between content items 100 generally. For example, the movie "Battle" 100a may be linked to the e-book "Battle of Time" 100b, the movie "Battle—Uncut" 100c, and the "Battle wiki page" 100d. In some embodiments, subjects may be linked (or otherwise determined to correspond to one another) if it is determined that at least a threshold amount of the content of the respective subjects match. For example, a scene of a movie and a chapter of an e-book may be linked if it is determined that a threshold number of words in the text of the chapter match words in a transcript of dialog included in the first scene.

In some embodiments, a linking process can include identifying a set of content items 100, identifying subject matter (or "subjects") 104 within the content items 100, comparing the subjects 104 to identify companion content (e.g., companion subjects 104 and/or companion content items 100), and linking the companion content (e.g., linking the companion subjects 104 and/or the companion content items 100). With regard to the movie "Battle" 100a and the e-book "Battle of Time" 100b, for example, the movie 100a and the e-book 100b may be indexed to identify subjects 104 within the movie 100a and subjects within the e-book 100b (e.g., to identify subjects S1a-S8a corresponding to scenes, characters, events, objects or the like addressed by the movie 100a and/or to identify subjects S1b-S3b, S6b, S7b, S9b and S10b corresponding to chapters, pages, characters, events, objects or the like described in the e-book 100b). In some embodiments, additional information for the identified subjects 104 can be collected (e.g., additional information for each of the S1a-S8a, S1b-S3b, S6b, S7b, S9b and S10b can be extracted from the content associated with the subjects, or gathered from other sources, such as users). The subjects 104 (e.g., S1a-S8a, S1b-S3b, S6b, S7b, S9b and S10b) (including the information corresponding thereto) may, then, be compared to one another to identify which, if any, of the identified subjects 104 are related to one another. If two subjects 104 are determined to be related, they may be linked to one another (e.g., a subject index can be updated to associate the two subjects 104 with one another). For example, if it is determined that scene I of the movie "Battle" 100a (e.g., S1a) corresponds to a chapter I of the e-book "Battle of Time" 100b (e.g., S1b) based at least in part on a comparison of a transcript of words spoken in the scene I of the movie "Battle" 100a to text of chapter I of the e-book "Battle of Time" 100b (e.g., if at least 50% of the words in the transcript are contained in the text of the chapter and/or at least 50% of the words in the chapter are contained in the transcript), a subject index can be updated to link the scene and the chapter (e.g., associating S1a and S1b). In some embodiments, content items 100 can be linked based on the linking of subjects 104 of the content items 100. For example, the movie "Battle" 100a and the e-book "Battle of Time" 100b may be linked based on a subject 104 of the movie (e.g., S1a corresponding to scene I of the movie 100a) being linked to a subject 104 of the e-book (e.g., S1b corresponding to chapter I of the e-book 100b). Thus, despite the fact the movie "Battle" 100a and the e-book "Battle of Time" 100b do not share the exact same storyline (e.g., subjects S1a-S8a do not exactly match subjects S1b-S3b, S6b, S7b, S9b and S10b), the movie 100a and the e-book 100b may be linked based at least in part on related, or companion, subjects 104. That is, for example, the movie "Battle" 100a and the e-book "Battle of Time" 100b may be linked based at least in part on similarities between subjects S1a-S8a and subjects S1b-S3b, S6b, S7b, S9b and S10b.

In some embodiments, a linking process can include comparing identified subjects 104 to one another to determine whether the subjects 104 and/or the content items 100 should be linked. For example, metadata for each subject 104 may be compared to metadata for each of the other subjects 104 to determine which, if any, of the other subjects 104 are related to and, thus, should be linked to the subject 104. With regard to the movie "Battle" 100a and the e-book "Battle of Time" 100b, for example, it may be determined that subjects S1a and S1b should be linked, subjects S2a and S2b should be linked, subjects S3a and S3b should be linked, subjects S6a and S6b should be linked, and subjects S7a and S7b should be linked (as depicted by the dashed lines of FIG. 1 extending between the respective pairs of subjects 104). With regard to the movie "Battle" 100a and the movie "Battle—Uncut" 100c, for example, it may be determined that subjects S1a-S8a should be linked to respective ones of subjects S1c-S8c (as depicted by the dashed lines of FIG. 1 extending between the respective pairs of subjects 104). Further, with regard to the movie "Battle" and the "Battle wiki page," it may be determined that the subjects S5a and S5d should be linked (as depicted by the dashed lines of FIG. 1 extending between the respective pairs of subjects 104). A similar linking process can be provided for each pair of content items 100. With regard to the e-book "Battle of Time" 100b and the movie "Battle—Uncut" 100c, for example, it may be determined that subjects S1b and S1c should be linked, subjects S2b and S2c should be linked, subjects S3b and S3c should be linked, subjects S6b and S6c should be linked, subjects S7b and S7c should be linked and subjects S9b and S9c should be linked (as depicted by the dashed lines of FIG. 1 extending between the respective pairs of subjects 104). In some embodiments, a linking process can include determining that a content item 100 is related to, or a companion of, another content item 100, if the given content item 100 includes at least one subject 104 that is related to, or a companion of, at least one subject 104 included in the other content item 100. Thus, it may be determined that the movie "Battle" 100a should be linked to each of the e-book "Battle of Time" 100b, the movie "Battle—Uncut" 100c, and the "Battle wiki page" 100d based on the links between the subjects of the movie "Battle" 100a and the subjects 104 of the other content items 100. In some embodiments, the movie "Battling Foes" 100e may not have any subjects 104 that are related to, or companions of, subjects 104 of the other content items 100, as illustrated by the absence of links between any of the subjects S20e-S24e and any of the subjects 104 of the other content items 100. Thus, the movie "Battling Foes" 100e may not be related to, or a companion of, any of content items 100a-100d.

Figure 2:
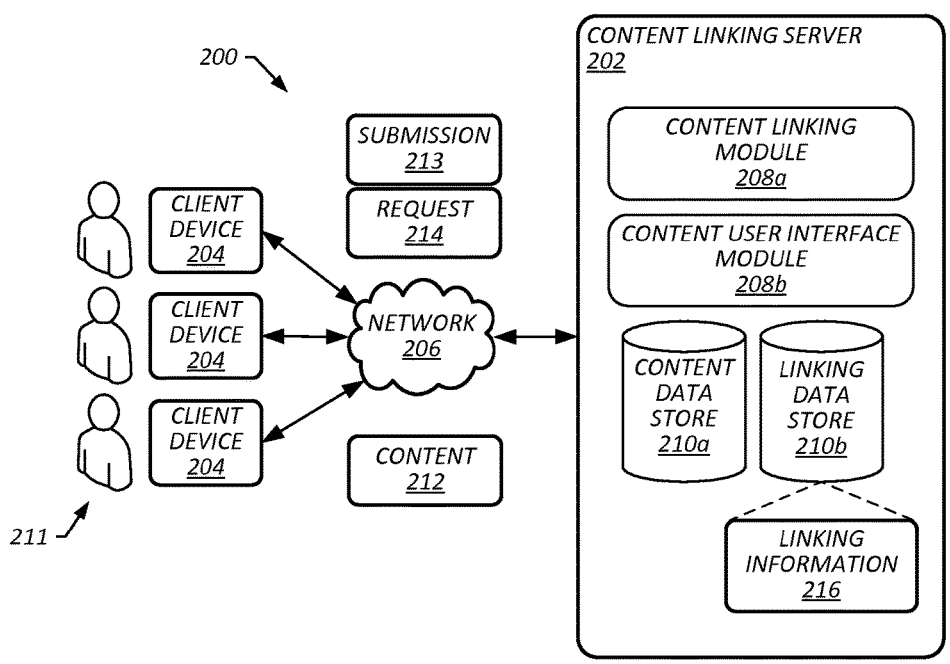
FIG. 2 is a diagram that illustrates a content linking environment in accordance with one or more embodiments.

FIG. 2 is a diagram that illustrates a content linking environment ("environment") 200 in accordance with one or more embodiments. In some embodiments, the environment 200 can include a content linking server ("linking server") 202 coupled to one or more client devices ("clients") 204 via a communications network ("network") 206. In some embodiments, the linking server 202 can include a content linking module 208a, a content user interface module 208b, a content data store 210a, and a linking data store 210b.

As described herein, in some embodiments, the linking server 202 can be employed to serve content (e.g., content items 100) for presentation to users 211, and/or to link, or otherwise associate, companion content (e.g., companion subjects 104 and/or companion content items 100). In some embodiments, the content linking module 208a may be employed to perform some or all of the various functions and/or features relating to linking, or otherwise associating, companion subjects 104 and/or companion content items 100. The content linking module 208a may be employed, for example, to perform some or all of the portions of the method 300 described herein. In some embodiments, the content user interface (UI) module 208b may be employed to perform some or all of the various functions and/or features relating to presenting content and/or receiving user input, or other interactions, relating to the content. The content UI module 208b may be employed, for example, to perform some or all of the portions of the method 600 described herein.

The network 206 may include an element or system that facilitates communication between entities of the environment 200. For example, the network 206 may include an electronic communications network, such as the Internet, a local area network ("LAN"), a wide area network ("WAN"), a wireless local area network ("WLAN"), a cellular communications network, and/or the like. In some embodiments, the network 206 can include a single network or a combination of networks.

A client device 204 may include any variety of electronic devices, such as a computer device. A client device 204 may include, for example, one or more of a personal computer, a server, a laptop computer, a tablet computer, a personal digital assistant (PDA), a smart phone, a television, an e-book reader, and/or the like. A client device 204 may include a device capable of communicating information via the network 206, and may be a client of the linking server 202. A client device 204 may include various input/output (I/O) interfaces, such as a graphical user interface (e.g., a display screen), an audible output user interface (e.g., a speaker), an audible input user interface (e.g., a microphone), an image acquisition interface (e.g., a camera), a keyboard, a pointer or a selection device (e.g., a mouse, a trackball, a touchpad, a touchscreen, a stylus or the like), a printer, and/or the like. A client device 204 may include general computing components and/or embedded systems optimized with specific components for performing specific tasks. A client device 204 may include programs/applications that can be used to generate a request for content, to provide content, to render content, and/or to send/receive requests to/from other devices via the network 206. Such programs/applications may include, for example, client applications used for communicating with the linking server 202. For example, a client device 204 may include an Internet browser application that facilitates communication with the network 206 and/or other entities of the environment 200. In some embodiments, a program/application of a client device 204 includes modules having program instructions that are executable by a computer system to perform some or all of the functionality described herein with regard to the client device 204. In some embodiments, a client device 204 can include one or more computer systems similar to that of the computer system 1000 described herein with regard to at least FIG. 8.

The linking server 202 may include a computing device having network connectivity and that is capable of providing one or more services to network clients, such as the client devices 204. These services may include storing and/or processing of data. For example, a linking server 202 may receive a request 214 for content from a client device 204, may identify content 212 responsive to the request 214, and/or may serve the content 212 to the client device 204. As a further example, the linking server 202 may receive a submission 213 from a client device 204, process the submission 213 to extract data therefrom, and store the extracted data in a data store (e.g., data stores 210a and 210b). Although certain embodiments are described with regard to a single server for the purpose of illustration, embodiments may include employing multiple servers, such as a plurality of distributed servers. In some embodiments, a linking server 202 can include one or more computer systems similar to that of the computer system 1000 described herein with regard to at least FIG. 8.

The data stores 210a and 210b may each include a medium for the storage of data thereon. A data store may include a non-transitory computer-readable medium storing data thereon that is accessible by various entities of the environment 200, such as a data store management system, or database management system ("DBMS"), of the linking server 202. In some embodiments, the content data store 210a may include a database storing one or more content items 100, such as movies, e-books, audio books, videos, television programs, songs, computer and video games, multi-media content, and/or the like. In some embodiments, the linking data store 210b may include a database storing linking information 216. The linking information 216 may include information about the content items 100, information about the subjects 104 and/or information indicative of the relationships between the various content items 100 and the subjects 104. In some embodiments, the linking information 216 may include one or more of a set of subject records, a content item subject index, a subject linking index, and/or a content item linking index.

As described herein, in some embodiments, the environment 200 can be employed to link companion content and/or provide for display of the linked content.

Figure 3:
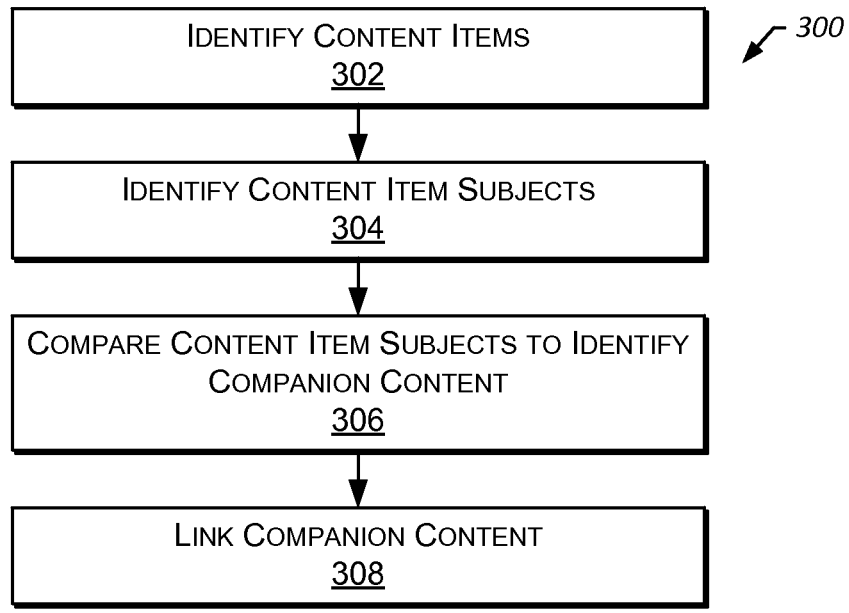
FIG. 3 is a flow diagram that illustrates a method of linking companion content in accordance with one or more embodiments.

FIG. 3 is a flow diagram that illustrates a method 300 of linking companion content in accordance with one or more embodiments. The method 300 may generally include identifying content items (block 302), identifying content item subjects (block 304), comparing content item subjects to identify companion content (block 306), and linking companion content (block 308). In some embodiments, some or all of the portions of the method 300 may be performed, or otherwise implemented, by the content linking module 208a.

In some embodiments, identifying content items (block 302) can include selecting, or otherwise identifying, one or more content items 100. For example, identifying a content item can include selecting, or otherwise identifying, the movie "Battle" (e.g., content item 100a), the e-book "Battle of Time" (e.g., content item 100b), the movie "Battle—Uncut" (e.g., content item 100c), the "Battle wiki page" (e.g. content item 100d), and the movie "Battling Foes" (e.g., content item 100e) from the set of content items 100 stored in the content data store 210a.

In some embodiments, identifying content item subjects (block 304) can include indexing the identified content items 100 to identify one or more subjects 104 addressed by the identified content items 100. For example, identifying content item subjects may include processing the movie "Battle" 100a to identify the subjects S1a-S8a; processing the e-book "Battle of Time" 100b to identify the subjects S1b-S3b, S6b, S7b, S9b and S10b; processing the movie "Battle—Uncut" 100c to identify the subjects S1c-S8c, S9c and S11c; processing the "Battle wiki page" 100d to identify the subject S5d; and processing the movie "Battling Foes" 100e to identify the subjects S20e-S24e.

In some embodiments, identifying content item subjects can include the use of an indexing routine, or other suitable data extraction process or algorithm. For example, identifying content item subjects may include executing an indexing routine to identify the subjects 104 from the identified content items 100. With regard to the movie "Battle" 100a for example, an indexing routine may be executed to identify each of the subjects S1a-S8a.

In some embodiments, identifying content item subjects can include the use of a metadata extraction routine, or other suitable data extraction process or algorithm, to collect metadata for the identified subjects 104. For example, identifying content item subjects may include executing a metadata extraction routine to identify metadata (or "subject metadata") relating to the identified subjects 104. In some embodiments, the metadata for a given subject 104 can include a set of data or information collected or otherwise obtained for the given subject 104.

In some embodiments, the metadata for a subject may include, but is not limited to, the following: a content item family identifier (e.g., "The Battle Series" for S1a based on the "Battle" movie being part of the "The Battle Series"); a content item identifier indicative of the content item including the subject (e.g., "the movie Battle" for subject S1a); a format identifier indicative of the format of the content item including the subject (e.g., "movie" for subject S1a); a subject matter type indicative of the type of subject matter, such as a scene, a character, an event, an object or the like of the movie (e.g., "scene" for subject S1a); a timestamp indicative of a time associated with the subject matter, such as the date and time associated with the subject according to the storyline of the content item (e.g., "2 pm, May 31, 300AD" for subject S1a); a position indicative of a relative position of the subject, such as where the subject is located on a timeline of the storyline of the content item (e.g., "1" for subject S1a); the content including the subject, such as a transcription of words spoken during a portion of a movie scene that contains the subject, the text of a passage in a book that contains the subject, and/or the like (e.g., a transcript of the dialogue of scene 1 of the movie "Battle" for subject S1a and/or text of chapter 1 of the e-book "Battle of Time"); a summary of the subject content, such as a battle scene, a love scene, characters present, and/or the like (e.g., "battle scene" for subject S1a); keywords associated with the subject, such as keywords extracted from the content associated with the subject (e.g., "first battle" for subject S1a); a relevance score indicative of the importance of the subject, such as a high score for relatively important subjects or a low score for relatively unimportant subjects (e.g., a moderate score of "5" for subject S1a).

In some embodiments, identifying content item subjects can include collecting metadata information from user submissions. For example, identifying content item subjects may include generating, or otherwise obtaining, metadata via crowd-sourcing. Crowd-sourcing may refer to the process of obtaining needed services, ideas, or content by soliciting contributions from a large group of people (e.g., an online community), rather than from traditional employees or suppliers. In the context of gathering information for content items 100 (e.g., for movies, books, electronic books, audio books, comic books, videos, television programs, songs, computer and video games, multi-media content, and the like), the information may come from an undefined public (e.g., viewers, readers, players, etc.) rather than from sources that are commissioned from a specific, named group (e.g., employees commissioned to catalogue information about the content items). In some embodiments, users 211 can provide submissions 213 that include information about the identified subjects 104, and data extracted from the submissions 213 can be used to populate the metadata for the subjects. In the context of the movie "Battle" 100a, for example, viewers may be encouraged to submit information (e.g., via submissions 213) regarding what subjects 104 they believe are present in the movie 100a, what portions of other content items 100 (or companion content items) are related to the identified subjects 104, descriptions of the identified subjects 104, and so forth. In some embodiments, the data of the user submission 213 (or the "crowd-sourced" information) can be used to populate various aspects of the metadata for the identified subjects. For example, if a user 211 submits (e.g., via his/her client device 204 and the network 206) a submission 213 that indicates that subject S1a (e.g., scene I of the movie "Battle") occurs at 2 pm on May 31, 300AD, the submission 213 may be processed to extract the time and date of "2 pm on May 31, 300AD," and the "timestamp" metadata for the subject S1a may be updated to include, or otherwise incorporate, the user submitted time and date of "2 pm on May 31, 300AD."

Figure 4:
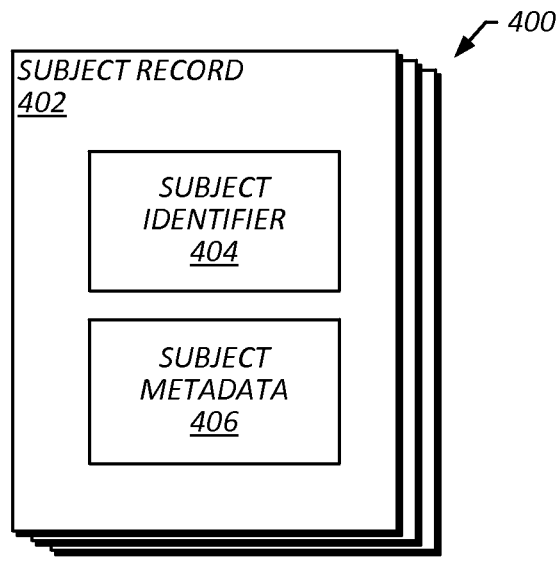
FIG. 4 is a block diagram that illustrates a set of subject records in accordance with one or more embodiments.

In some embodiments, identifying content item subjects can include generating a file, or record, that includes information for each of the identified subjects 104. For example, identifying content item subjects may include generating a set of records that includes a record for each of the subjects S1*a*-S8*a* (of the movie "Battle" 100*a*), the subjects S1*b*-S3*b*, S6*b*, S7*b*, S9*b* and S10*b* (of the e-book "Battle of Time" 100*b*), the subjects S1*c*-S8*c*, S9*c* and S11*c* (of the movie "Battle—Uncut" 100*c*), the subject S5*d* (of the "Battle wiki page" 100*d*) and the subjects S20*e*-S24*e* (of the movie "Battling Foes" 100*e*). FIG. 4 is a block diagram that illustrates a set of subject records 400 in accordance with one or more embodiments. In some embodiments, an individual record data structure ("subject record") 402 can include a subject identifier 404 and subject metadata 406. In some embodiments, a subject record 402 can be generated for each identified subject 104 of the identified content items 100. For example, a subject record 402 may be generated for each of the identified subjects 104 of the movie "Battle" 100*a*, the e-book "Battle of Time" 100*b*, the movie "Battle—Uncut" 100*c*, the "Battle wiki page" 100*d*, and the movie "Battling Foes" 100*e*. That is, for example, a set of subject records 400 can include an individual subject record 402 for each of the subjects S1*a*-S8*a*, S1*b*-S3*b*, S6*b*, S7*b*, S9*b*, S10*b*, S1*c*-S8*c*, S9*c*, S11*c*, S5*d* and S20*e*-S24*e*. The set of subject records 400 may be stored in the linking information 216 of linking data store 210*b*.

In some embodiments, the subject identifier 404 may include a name or other identifier that uniquely identifies the subject record 402 from other records 402 from the set of subject records 400. For example, a subject identifier 404 may include a name (e.g., "Scene I of the movie Battle), a number (e.g., "32789"), or an alphanumeric identifier (e.g., "B23FM"). In some embodiments, the subject metadata 406 of a subject record 402 for a subject 104 may include the metadata extracted, determined, or otherwise collected for the subject 104. For example, as discussed above, the subject metadata 406 of the subject record 402 for the subject S1*a* of the movie "Battle" 100*a* may include a content item family identifier of "The Battle Series," a content item identifier of "movie—Battle," a format identifier of "movie," and so forth.

In some embodiments, identifying content item subjects can include updating a content item subject index to reflect the subjects 104 identified in the respective content items 100. For example, identifying content item subjects may include generating, or otherwise modifying or updating, a content item subject index to reflect the subjects 104 identified as a result of indexing the content items 100. A content item subject index may include a listing of each of the identified content items 100, and an identification of the set of one or more subjects 104 identified for each of the respective content items 100. FIG. 5A is a table that illustrates a content item subject index 500 in accordance with one or more embodiments. In some embodiments, the content item subject index 500 includes an entry 502 for each of the identified content items 100 (e.g., an entry 502 for each of the movie "Battle" 100*a*, the e-book "Battle of Time" 100*b*, the movie "Battle—Uncut" 100*c*, the Battle wiki page 100*d*, and the movie "Battling Foes" 100*e*). Each entry 502 may include an identification of a corresponding content item 100 and a listing of subjects 504. The listing of subjects 504 may identify subjects 104 indexed from, or otherwise identified as being addressed in, the corresponding content item 100. For example, in the entry for the movie "Battle" 100*a*, the listing of subjects 504 may identify the subjects S1*a*-S8*a*. In some embodiments, the content item subject index 500 may be stored in the linking information 216 of linking data store 210*b*.

In some embodiments, comparing content item subjects to identify companion content (block 306) can include comparing each of the identified subjects 104 with some or all of the other identified subjects 104 to determine whether the subject 104 is related to, or is a companion of, any of the other subjects 104 and/or whether the content item 100 including the subject 104 is related to, or a companion of, any of the other identified content items 100.

For example, comparing content item subjects to identify companion content may include comparing each subject 104 of the set of subjects S1*a*-S8*a*, S1*b*-S3*b*, S6*b*, S7*b*, S9*b*, S10*b*, S1*c*-S8*c*, S9*c*, S11*c*, and S5*d* to each of the other subjects 104 of the set of subjects to determine whether each subject 104 is related to, or is a companion of, any of the other subjects 104. In some embodiments, a given subject 104 may be determined to be related to, or a companion of, another subject 104 if it is determined that the given subject 104 is the same or similar to the other subject 104 (e.g., it is determined that the subject metadata 406 for the given subject 104 matches or is otherwise similar to the subject metadata 406 for the other subject 104). With regard to the subject S1*a* of the movie "Battle" for example, comparing content item subjects to identify companion content may include comparing the subject metadata 406 for the subject S1*a* to the subject metadata 406 for each of the subjects S1*a*-S8*a*, S1*b*-S3*b*, S6*b*, S7*b*, S9*b*, S10*b*, S1*c*-S8*c*, S9*c*, S11*c*, S5*d* and S20*e*-S24*e* to determine that the subject S1*a* is related to, or a companion of, the subjects S1*b* and S1*c*.

In some embodiments, comparing content item subjects to identify companion content (block 306) can include assessing the subject links identified (e.g., the identified links between related, or companion, subjects 104) to determine whether any of the identified content items 100 are related to, or a companion of, any of the other identified content items 100. For example, comparing content item subjects to identify companion content may include assessing the subject links identified to determine whether any of the movie "Battle" 100*a*, the e-book "Battle of Time" 100*b*, the movie "Battle—Uncut" 100*c*, the "Battle wiki page" 100*d*, and the movie "Battling Foes" 100*e* are related, or companion content of, any of the others. In some embodiments, a content item 100 may be determined to be related to, or a companion of, another content item 100 if the given content item 100 includes at least one subject 104 that is related to, or a companion of, at least one subject 104 included in the other content item 100. That is, content items 100 may be determined to be related to, or a companion of, items 100 if they have a subject link therebetween. With regard to the movie "Battle" for example, comparing content item subjects to identify companion content may include determining that movie "Battle" 100*a* is related to, or a companion of, the e-book "Battle of Time" 100*b* based at least in part on the identified subject links between the subjects S1*a* and S1*b*, the subjects S2*a* and S2*b*, the subjects S3*a* and S3*b*, the subjects S6*a* and S6*b*, and/or the subjects S7*a* and S7*b* (depicted by the dashed lines (or "subject links") of FIG. 1 extending between the respective pairs of subjects 104). Further, comparing content item subjects to identify companion content may include determining that movie "Battle" 100*a* is related to, or a companion of, the movie "Battle—Uncut" 100*c* based at least in part on the subject links between the subjects S1*a*-S8*a* any of the respective ones of the subjects S1c-S8c (depicted by the dashed lines (or "subject links") of FIG. 1 extending between the respective pairs of subjects 104).

In some embodiments, linking companion content (block 308) can include updating a subject linking index to reflect the associations between related, or companion, subjects 104. For example, linking companion content may include generating, or otherwise modifying or updating, a subject linking index to reflect the associations between the identified companion subjects 104. For example, a subject linking index may include a listing of each of the identified subjects 104, and an identification of the set of one or more subjects 104 that are identified as companions of the identified subjects 104. FIG. 5B is a table that illustrates a subject linking index 520 in accordance with one or more embodiments. In some embodiments, the subject linking index 520 includes an entry 522 for each of the identified subjects (e.g., an entry 522 for each of the subjects S1a-S8a, S1b-S3b, S6b, S7b, S9b, S10b, S1c-S8c, S9c, S11c, S5d and S20e-S24e). Each entry 522 of the subject linking index 500 may include an identification of a corresponding subject 104 and a listing of companion subjects 524. The listing of companion subjects 524 may identify one or more subjects 104 determined to be related, or companion subjects, to the corresponding subject 104. For example, the entry 522 for the subject S1a may include a listing of the subjects S1b and S1c identified as related to, or companion subjects of, the subject S1a. In some embodiments, the subject linking index 500 may be stored in the linking information 216 of the linking data store 210b.

In some embodiments, linking companion content can include updating a content item linking index to reflect the associations between related, or companion, content items 100. For example, linking companion content may include generating, or otherwise modifying or updating, a content linking index to reflect the associations between the content items 100 of the identified companion content items 100. A content item linking index may include a listing of each of the identified content items 100, and an identification of the set of one or more content items 100 that are identified as companions of the identified content items 100. FIG. 5C is a table that illustrates a content item linking index 550 in accordance with one or more embodiments. In some embodiments, the content item linking index 550 includes an entry 552 for each of the identified content items (e.g., an entry 552 for each of the content items the movie "Battle" 100a, the e-book "Battle of Time" 100b, the movie "Battle—Uncut" 100c, the Battle wiki page 100d, and the movie "Battling Foes" 100e). Each entry 552 of the content item linking index 550 may include an identification of a corresponding content item 100 and a listing of companion content items 554. The listing of companion content items 554 may identify the content items 100 determined to be related, or companion content items, to the corresponding content item 100. For example, the entry for the movie "Battle" 100a may include a listing of the e-book "Battle of Time" 100b, the movie "Battle—Uncut" 100c, and the Battle wiki page 100d. In some embodiments, the content item linking index 550 may be stored in the linking information 216 of linking data store 210b.

In some embodiments, the subject records 402 of the set of subject records 400, the content item subject index 500, the subject linking index 520, and/or the content item linking index 550 can be used to identify related, or companion, subjects 104 and/or related, or companion, content items 100. For example, with regard to the subject S1a corresponding to a first scene of the movie "Battle," the related, or companion, subjects S1b and S1c can be easily identified using the listing of the companion subjects 524 of the subject linking index 520. As another example, with regard to the movie "Battle" 100a, the related, or companion, content items 100 including the e-book "Battle of Time" 100b, the movie "Battle—Uncut" 100c and the "Battle wiki page" 100d can be easily identified using the listing of companion content items 554 of the content item linking index 550. Such access to records and indexes can be particularly useful when it is desirable to present content along with information about companion content.

Figure 6:
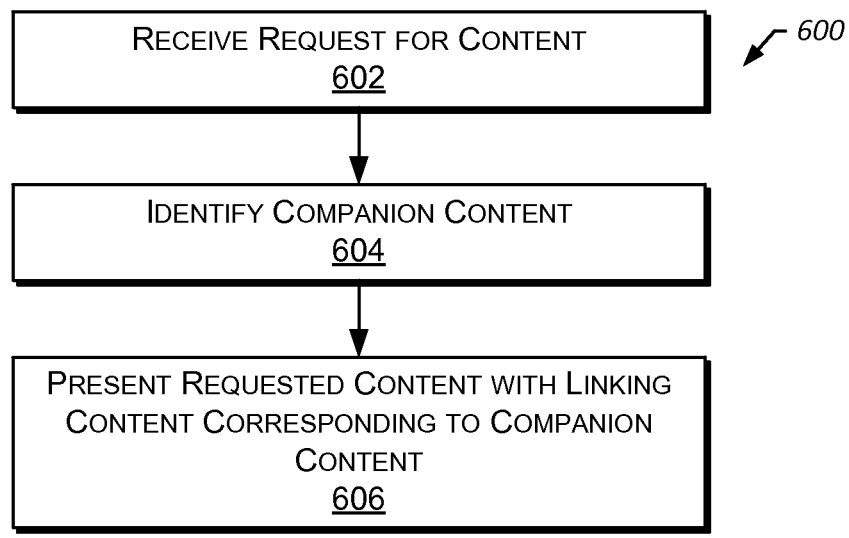
FIG. 6 is a flow diagram that illustrates a method of presenting linked content in accordance with one or more embodiments.

FIG. 6 is a flow diagram that illustrates a method 600 of presenting linked content in accordance with one or more embodiments. The method 600 may generally include receiving a request for content (block 602), identifying companion content (block 604), and presenting the requested content with linking content corresponding to companion content (block 606). In some embodiments, some or all of the portions of the method 600 may be performed, or otherwise implemented, by the content user interface module 208b.

In some embodiments, receiving a request for content (block 602) may include receiving a request to display, play, or otherwise present content. For example, receiving a request to present content may include receiving a request to play a movie on a display device, a request to display an e-book on a graphical user interface (GUI) of an e-book reader, a request to access a webpage that includes information about a content item, a storyline or subject, and/or the like. In some embodiments, such a request may include a user submitted request to view or listen to a content item via a client device 204. For example, a user 211 may open a video application of their client device 204 and submit a request 214 to view the movie "Battle," and receiving a request to present content may include receiving the request 214.

In some embodiments, identifying companion content (block 604) may include identifying content that is a companion of the requested content. For example, if a user 211 submits a request 214 to view the movie "Battle" 100a, then identifying companion content may include identifying the companion content items 100 for the movie "Battle" 100a (e.g., the e-book "Battle of Time" 100b, the movie "Battle—Uncut" 100c, and the "Battle Wiki page" 100d) and/or the companion subjects 104 to the subjects 104 of the movie "Battle" 100a (e.g., identifying subject S1b (chapter I of the e-book Battle of time 100b) and subject S1c (scene I of the movie "Battle—Uncut" 100c) as companion content for scene I of the movie "Battle", identifying subject S2b (chapter III of the e-book Battle of time 100b) and subject S2c (scene II of the movie "Battle—Uncut" 100c) as companion content for scene II of the movie "Battle", and so forth, for each of the subjects 104 of the movie "Battle" 100a). As discussed in more detail below, in some embodiments, the companion content can be identified using the indexes 500, 520 and/or 550. For example, with regard to the movie "Battle" 100a, the related, or companion, content items 100 including the e-book "Battle of Time" 100b, the movie "Battle—Uncut" 100c and the "Battle wiki page" 100d can be identified by accessing the listing of companion content items 554 associated with the movie "Battle" in the content item linking index 550. The subjects S1a-S8a of the movie "Battle" 100a can be identified by accessing the listing of subjects S1a-S8a associated with the movie "Battle" 100a in the content item subject index 500. With regard to the subject S1a corresponding to a first scene of the movie "Battle," the related, or companion, subjects S1b and S1c, can be identified by accessing the listing of the companion subjects 524 associated with the subject S1a in the subject linking index 520. Similar identifications of companion subjects can be made for each of the subjects 104 of the movie "Battle" 100a using the subject linking index 520.

Figure 7A:
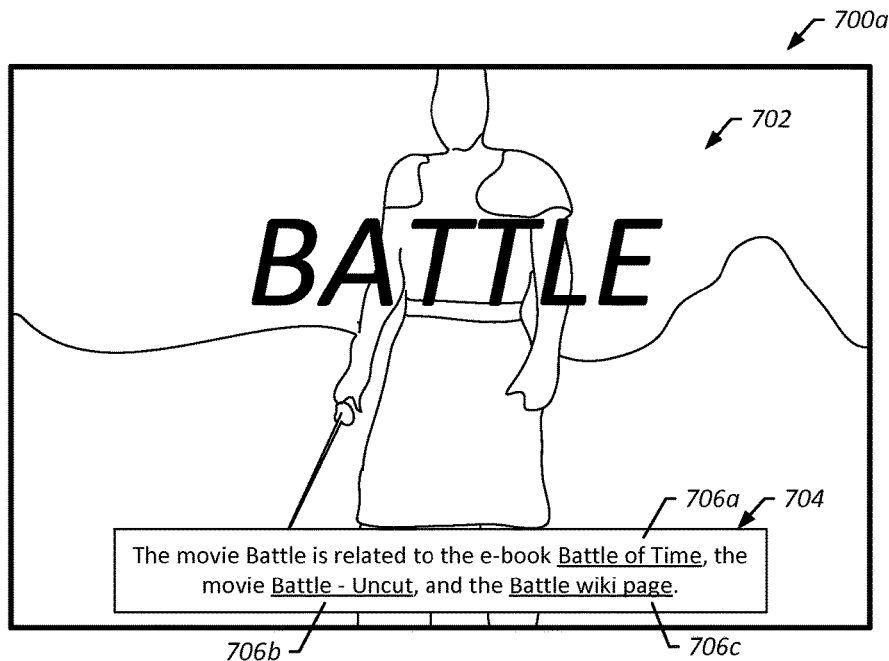
FIGS. 7A and 7B are illustrations of an exemplary graphical user interfaces displaying linking content in accordance with one or more embodiments.
Figure 7B:
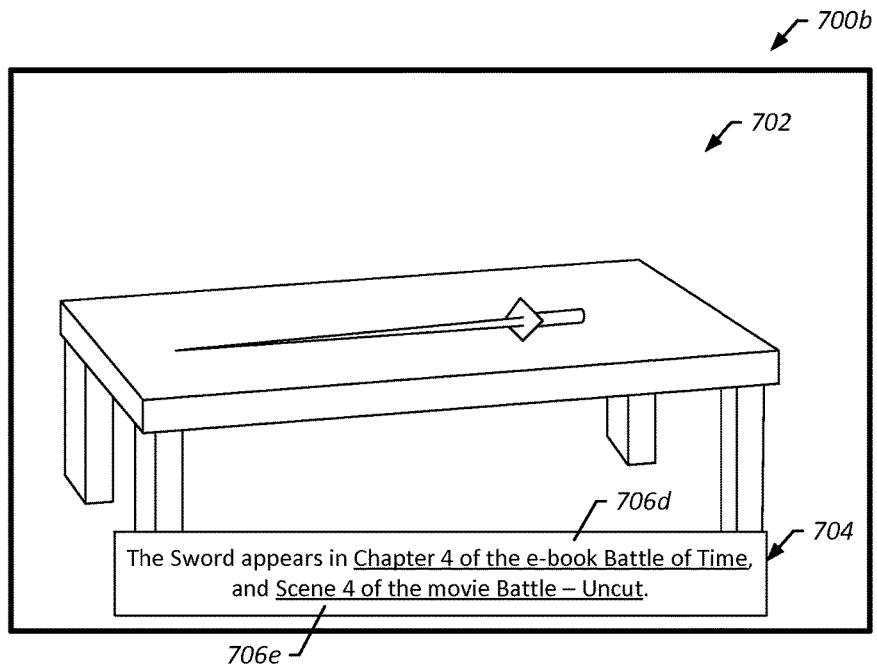

In some embodiments, presenting the requested content with linking content corresponding to companion content (block 606) can include causing the presentation of the requested content. With regard to the request 214 to view the movie "Battle," for example, presenting the requested content may include serving, to the client device 204, content 212 including the movie "Battle" and the client device 204 providing for playback of the movie via a graphical user interface (GUI) of the client device 204. In some embodiments, presenting the requested content with linking content corresponding to companion content can include presenting linking content that provides information regarding companion content. With regard to the request 214 to view the movie "Battle," for example, presenting the requested content may include serving, to the client device 204, content 212 that includes the movie "Battle" and linking content that provides information regarding companion content for the movie "Battle" and/or the subjects 104 of the movie "Battle". Continuing with the above example, the linking content may include information regarding the identified companion content, such as companion content items 100 for the movie "Battle" (e.g., the e-book "Battle of Time" 100b, the movie "Battle—Uncut" 100c, and the "Battle Wiki page" 100d) and/or the companion subjects (e.g., subject S1b (chapter I of the e-book Battle of time 100b), subject S1c (scene I of the movie "Battle—Uncut" 100c), subject S2b (chapter III of the e-book Battle of time 100b), subject S2c (scene II of the movie "Battle—Uncut" 100c), and so forth). The linking content may be presented in association with presentation of the content item 100 and/or the presentation of the corresponding subjects 104 (e.g., during presentation of the content item 100). FIG. 7A is an illustration of an exemplary graphical user interface 700a displaying a linking content item in accordance with one or more embodiments. In the illustrated embodiment, primary content 702 includes the opening credits of the movie "Battle" 100a, and is displayed along with linking content 704 that includes a pop-up dialogue (or visual queue) overlaid onto the primary content 702 that states, "The movie Battle is related to the e-book Battle of Time, the movie Battle—Uncut, and the Battle wiki page." As a further example, during the playback of scene I of the movie "Battle," the primary content 702 (e.g., including scene I of the movie "Battle" 100a) may be displayed along with the linking content 704 that includes a visual queue (e.g., a pop-up dialogue overlaid onto the primary content 702) that states "Scene I of the movie Battle is related to Chapter I of the e-book Battle of Time and Scene I of the movie Battle—Uncut." FIG. 7B is an illustration of another exemplary graphical user interface 700b displaying a linking content item in accordance with one or more embodiments. In the illustrated embodiment, the primary content 702 includes a portion of scene 4 of the movie "Battle" 100a, and is displayed along with linking content 704 that includes a pop-up dialogue overlaid onto the primary content 702 that states, "The Sword appears in Chapter 4 of the e-book Battle of Time, and Scene 4 of the movie Battle—Uncut." Thus, for example, linking content indicative of a relationship between a subject 104 of a content item 100 being presented and a companion subject 104 may be presented in association with (e.g., at or near the time of) presentation of the subject 104 of the content item 100.

In some embodiments, the linking content 704 is identified based on the subjects of content items 504, the content items 100, the companion subjects 524 and/or the list of companion content items 554 of the content item subject index 500, the subject linking index 520, and/or the content item linking index 550. For example, in response to receiving a request 214 for the movie "Battle," the entry 552 for the movie "Battle" of the content item linking index 550 may be used to determine that each of the e-book "Battle of Time" 100b, the movie "Battle—Uncut" 100c, and the "Battle Wiki page" 100d are companion content items for the movie "Battle" 100a. Further, the entry 502 for the movie "Battle" of the content item subject index 500 may be used to determine that each of the subjects S1a-S8a is addressed in the movie "Battle" 100a, and the subject linking index 520 can be used to identify the companion subjects for each of the subjects S1a-S8a (e.g., identify the companion subjects S1b and S1c for the subject S1a, and so forth). In some embodiments, linking content may be displayed when at least one of a corresponding set of companion subjects is presented. For example, when scene I (S1a) of the movie "Battle" 100a is played back, linking content 704 including a pop-up dialogue referencing chapter I (S1b) of the e-book "Battle of Time" 100b and scene I (S1c) of the movie "Battle—Uncut" 100c may be displayed. Further, when scene II (S2a) of the movie "Battle" 100a is played back, linking content 704 including a pop-up dialogue referencing chapter III (S2b) of the e-book "Battle of Time" 100b and scene II (S2c) of the movie "Battle—Uncut" 100c may be displayed. This dynamic display of linking content 104 (e.g., including references to companion subjects 104 of the subject 104 that is currently being addressed, or otherwise presented) may continue throughout the presentation of the content item 100 as the respective subjects 104 are addressed. Thus, the user may be able to see where portions of the storyline for the content item 100 being presented relates to, or is a companion of, one or more portions of a storyline of another content item 100.

In some embodiments, the linking content 704 may enable a user to navigate to companion content. For example, the linking content 704 may include an interactive element that can be selected by the user to navigate to the companion content. In the context of the above examples related to playback of the movie "Battle," for example, the linking content 704 of GUI 700a (e.g., the pop-up dialogue of FIG. 7A) may include a first link 706a (as indicated by the underlined text) that, when selected, navigates to, or otherwise directs the user to the e-book "Battle of Time" 100b, a second link 706b (as indicated by the underlined text) that, when selected, navigates to, or otherwise directs the user to the movie "Battle—Uncut" 100c, and a third link 706c (as indicated by the underlined text) that, when selected, navigates to, or otherwise directs the user to the "Battle wiki page" 100d. As another example, a pop-up dialogue that states "This Scene is similar to Chapter I of the book "Battle of Time" (e.g., displayed during playback of the first scene in the movie "Battle") may include a hyperlink that, when selected, navigates to, or otherwise directs the user to, chapter I of the e-book "Battle of Time." Further, the linking content 704 of GUI 700b (e.g., the pop-up dialogue of FIG. 7B) may include a first link 706d (as indicated by the underlined text) that, when selected, navigates to, or otherwise directs the user to Chapter 4 of the e-book "Battle of Time" 100b, a second link 706e (as indicated by the underlined text) that, when selected, navigates to, or otherwise directs the user to Scene 4 of the movie "Battle—Uncut" 100c.

In some embodiments, the linking content 704 and/or the interactive nature thereof may be based on the user's privileges or rights. For example, the user associated with presentation of the content may be identified (e.g., based on user log-in information or other credentials), and it may be determined whether the user has sufficient privileges (or rights) to access the linked to content (e.g., whether the user has purchased access to the linked-to content). If the user is determined to have sufficient privileges to access the linked content, then the user may be provided corresponding access to the linked to content. If the user is determined to not have access to the linked content, then the user may be provided with no access or only partial access to the linked to content. With regard to the first link 706d the linking content 704 of GUI 700b (e.g., the pop-up dialogue of FIG. 7B), if it is determined that the user has purchased the e-book and, thus, has sufficient privileges to access the entirety of the e-book, then, upon selection of the link 706d, Chapter 4 of the e-book "Battle of Time" 100b may be presented, and the user may have access to all of the content of the e-book 100b, including chapter 4 and the other chapters. If, however, it is determined that the user has not purchased the e-book 100b and, thus, does not have sufficient privileges to access some or all of the e-book 100b, then, upon selection of the link 706d, the user may be notified of their lack sufficient privileges to access some or all of the e-book, and may be provided with an opportunity to gain access to the e-book 100b. For example, a prompt may be displayed, stating, "You do not have access to this book, to gain access to the e-book, but you can purchase the e-book here", with the text "here" containing a hyperlink to a webpage for purchasing the e-book "Battle of Time" 100b. Or, the user may be granted limited access. If, for example, it is determined that the user has not purchased the e-book 100b and, thus, does not have full access to the e-book 100b, then, upon selection of the link 706d, the user may be directed to Chapter 4 of the e-book "Battle of Time" 100b or the page where the "Sword" is addressed, but may not have access to other portions of the e-book 100b, such that they are inhibited from viewing the other chapters or pages of the e-book 100b. In such an embodiment, presentation of the content may be accompanied by an opportunity to gain access to the other portions of the content. For example, a prompt may be displayed, stating, "You do not have access to this book, to gain access to the e-book, but you can purchase the e-book here", with the text "here" containing a hyperlink to a webpage for purchasing the e-book "Battle of Time" 100b. Or, the user may be granted limited access. In some embodiments, the format of the linking content 704 may be indicative of the privileges or access available to the user. For example, with regard to the linking content 704 of GUI 700b (e.g., the pop-up dialogue of FIG. 7B), if it is determined that the user has purchased the e-book 100b and, thus, has full access to the e-book 100b, and the user has not purchased the movie "Battle—Uncut" 100c, then the text "Chapter 4 of the e-book Battle of Time" of the link 706d may be bolded (e.g., indicating full access to the corresponding content), and the text "Scene 4 of the movie Battle—Uncut" of the link 706e may not be bolded (e.g., indicating a lack of sufficient privileges and/or no or limited access to the corresponding content).

In some embodiments, the companion content may be cached. For example, the companion content corresponding to a set of linking content 704 may be retrieved from a data store and stored in memory (e.g., stored in a cache memory of the server 202 or the client device 204 on which the content item 100 is being viewed) during the period the linking content 704 is being presented. In some embodiments, the cached companion content may be removed from the memory when the corresponding linking content 704 is no longer being presented. Thus, the content linked-to by the linking content 704 may be readily available should the user select an interactive link of the linking content 704, or otherwise request, to access the linked-to companion content while the corresponding linking content 704 is being displayed.

In certain embodiments, user preferences may be selected to control what, if any, linking content is displayed. For example, a user may set a preference to display only linking content for related content items, but not related subjects. In such an embodiment, the linking content 704 of FIG. 7A may be displayed during the opening credits of the movie "Battle," but the linking content for companion subjects may not be displayed during playback of the movie "Battle." As another example, a user may set a preference to display only highly relevant linking content. In such an embodiment, if the "Battle wiki page" 100d is determined to be of low relevance, and the e-book "Battle of Time" and the movie "Battle—Uncut" are determined to be of high relevance, then the linking content 704 of FIG. 7A may merely state "The movie Battle is related to the e-book Battle of Time" (not referencing the "Battle wiki page").

Although certain embodiments are described with regard to display of a movie, embodiments may include providing linking content in a manner (e.g., visual, audible, and/or the like) that is suitable to the format or medium of the primary content. For example, a display of a portion of an e-book may be accompanied by linking content (e.g., a pop-up dialogue or a hyperlink in the text of the e-book) that informs the viewer that the e-book is related to the movie, that a particular subject of the e-book (e.g., a chapter, a page, a scene, a character, an event, an object or the like) is related to the movie and/or a particular subject of the movie (e.g., a scene, a character, an event, an object or the like of the movie). In the context of the above examples related to the display of chapter I of the e-book "Battle of Time," for example, a display of the text of the first page of chapter I may be accompanied by a pop-up dialogue (or a hyperlink in the text) in the e-book "Battle of Time" that states "This Chapter is similar to Scene I of the movie Battle" that, when selected, navigates to, or otherwise directs the user to, playback of Scene I of the movie "Battle." As a further example, playback of a portion of an audio book may be accompanied by an audible queue indicative of companion content. For example, the spoken statement "This Chapter is similar to Scene I of the movie Battle" may be provided at the beginning of playback of chapter I of the audio book "Battle of Time."

It will be appreciated that the methods 300 and 600 are exemplary embodiments of methods that may be employed in accordance with the techniques described herein. The methods 300 and 600 may be modified to facilitate variations of their implementation and use. The order of the methods 300 and 600 and the operations provided therein may be changed, and various elements may be added, reordered, combined, omitted, modified, etc. Portions of the methods 300 and 600 may be implemented in software, hardware, or a combination thereof. Some or all of the portions of the methods 300 and 600 may be implemented by one or more of the processors/modules/applications described herein.

Figure 8:
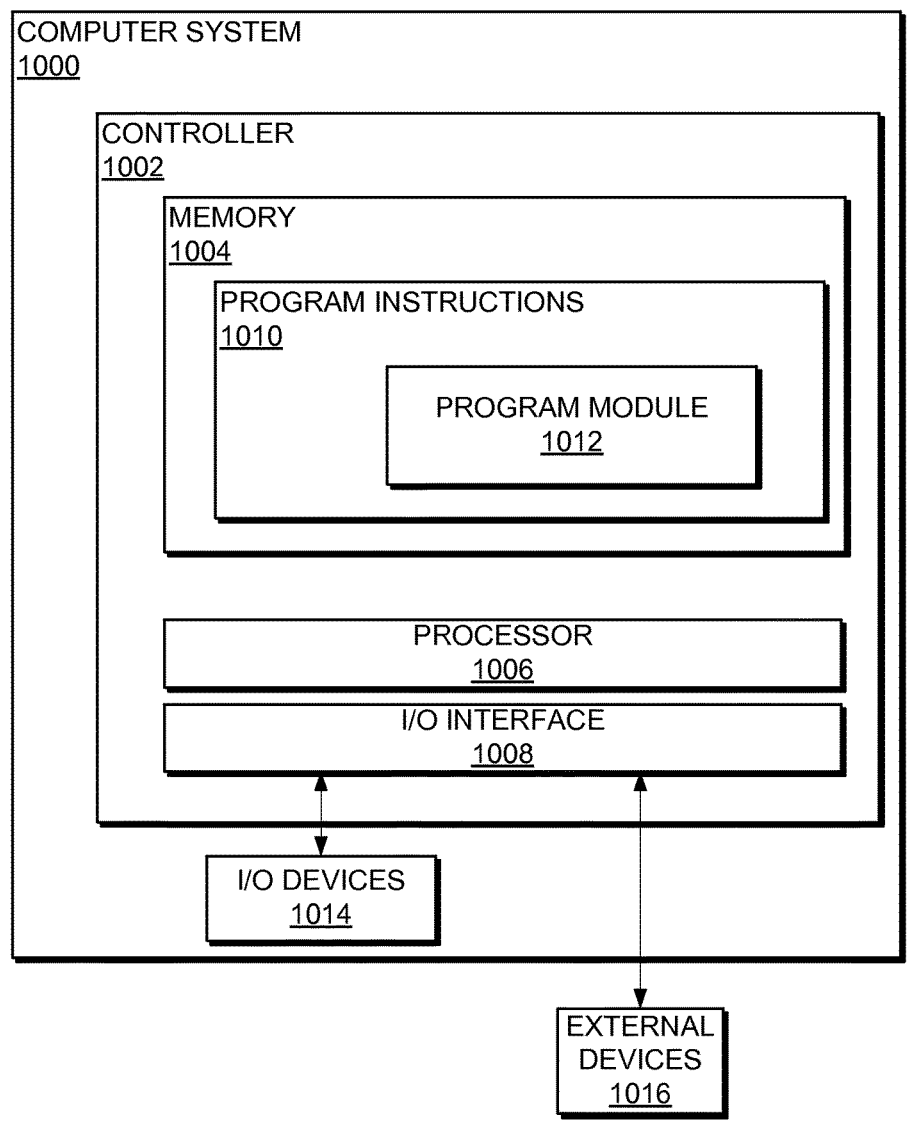
FIG. 8 is a diagram that illustrates an exemplary computer system in accordance with one or more embodiments.

FIG. 8 is a diagram that illustrates an exemplary computer system 1000 in accordance with one or more embodiments. In some embodiments, the computer system 1000 includes a controller 1002 for controlling the operational aspects of the computer system 1000. In some embodiments, the controller 1002 includes a memory 1004, a processor 1006, and an input/output (I/O) interface 1008. The memory 1004 may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010. The program instructions 1010 may include program modules 1012 (e.g., including subsets of program instructions 1010) that are executable by a computer processor (e.g., the processor 1006) to cause the functional operations (e.g., methods/routines/processes) described herein, including those described with regard to the methods 300 and 600. The program instructions 1010 may include, for example, program modules 1012 such as a content linking module 208*a* (e.g., for performing some or all of the operational aspects of the method 300), and/or a content user interface module 208*b* (e.g., for performing some or all of the operational aspects of the method 600). The processor 1006 may be any suitable processor capable of executing/performing program instructions. The processor 1006 may include a central processing unit (CPU) that carries out program instructions (e.g., program instructions of the program module(s) 1012) to perform arithmetical, logical, and input/output operations described herein. The processor 1006 may include one or more processors. The I/O interface 1008 may provide an interface for communication with one or more I/O devices 1014, such as a mouse/keyboard/touchscreen, a graphical user interface (GUI) (e.g., a display), and/or the like. A display may include a suitable electronic display. Devices may be connected to the I/O interface 1008 via a wired or a wireless connection. The I/O interface 1008 may provide an interface for communication with one or more external devices 1016, such as other computers, networks and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). As used throughout this application, the term "modify" may include making changes to something that exits or creating something new. For example, modifying a table may include changing at least a portion of an existing table, or generating a new table. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A method of linking related storylines, the method comprising:

identifying a transcript of dialogue spoken in a first scene of a movie on a first device, wherein the movie corresponds to a first storyline having an ordered series of scenes including the first scene and a second scene;

identifying, from crowd-sourced submissions, information comprising a description of the first scene of the movie;

determining, based on the information, a subject of the first scene of the movie;

identifying, based on the subject, text of a first chapter of an electronic book on a second device, wherein the electronic book corresponds to a second storyline, wherein the first scene of the first storyline is similar to the first chapter of the second storyline, and wherein the second scene of the first storyline is omitted from the second storyline;

determining that the first scene of the movie on the first device corresponds to the first chapter of the electronic book on the second device by determining that a threshold number of words in the text match transcript words in the transcript of dialog included in the first scene; and generating a data structure comprising a subject linking index to indicate that the first scene of the movie on the first device corresponds to text of the first chapter of the electronic book on the second device.

2. The method of claim 1, wherein the subject linking index comprises a set of entries that identify sets of two or more subjects that correspond to one another, and wherein generating the subject linking index to indicate that the first scene of the movie on the first device corresponds to text of the first chapter of the electronic book on the second device comprises:

generating an entry in the subject linking index for the first scene of the movie that identifies the first chapter of the electronic book as corresponding to the first scene of the movie, and generating an entry in the subject linking index for the first chapter of the electronic book that identifies the first scene of the movie as corresponding to text of the first chapter of the electronic book.

3. The method of claim 1, further comprising:
receiving a request to view the first scene of the movie; and
causing, in response to the request to view the first scene of the movie, presentation of:
   primary content comprising playback of the first scene of the movie; and
   linking content comprising an interactive link that is user selectable to navigate to the first chapter of the electronic book.

4. A method, comprising:
identifying, from crowd-sourced submissions, a description of a first content item presented at a first device, the first content item corresponding to a first storyline;
determining, based on the description, a first subject of the first content item presented at the first device;
determining a second subject of a second content item presented at a second device, the second content item corresponding to a second storyline;
determining first textual data associated with the first subject;
determining second textual data associated with the second subject;
comparing at least a portion of the first textual data to at least a portion of the second textual data;
determining that the first subject is related to the second subject; and
generating a data structure associating the first content item with the second content item.

5. The method of claim 4, wherein generating the data structure comprises generating the data structure including a content item linking index.

6. The method of claim 4, further comprising:
determining a first set of subjects associated with the first content item;
determining a second set of subjects associated with the second content item; and
determining that the first storyline is different from the second storyline by determining that the first set of subjects is different than the second set of subjects.

7. The method of claim 4, further comprising:
receiving a request to present the first content item;
causing presentation of primary content corresponding to the first content item; and
causing presentation of linking content indicative of an association between the first content item and the second content item.

8. The method of claim 7, wherein causing presentation of the linking content indicative of the association between the first content item and the second content item comprises causing presentation of an interactive element that is user selectable to navigate to the second content item.

9. The method of claim 4, wherein determining the first subject of the first content item comprises indexing the first content item to determine one or more subjects of the first content item, and determining the first subject of the first content item from the one or more subjects based on keywords in the indexing.

10. The method of claim 4, wherein determining that the first subject is related to the second subject comprises determining that at least a portion of the first textual data and at least a portion of the second textual data have equal values for at least an amount exceeding a first threshold.

11. The method of claim 4, further comprising:
associating the first subject with the second subject based at least in part on the determination that the first subject is related to the second subject.

12. The method of claim 11, wherein associating the first subject with the second subject comprises associating the first subject with the second subject using a subject linking index.

13. A system, comprising:
a processor; and
a memory comprising program instructions stored thereon that are executable by the processor to cause:
   identifying, from crowd-sourced submissions, a description of a first content item presented at a first device, the first content item corresponding to a first storyline;
   determining, based on the description, a first subject of the first content item associated with the first device;
   determining a second subject of a second content item associated with a second device, the second content item corresponding to a second storyline;
   determining first textual data associated with the first subject;
   determining second textual data associated with the second subject;
   comparing at least a portion of the first textual data to at least a portion of the second data;
   determining that the first subject is related to the second subject based on the comparison; and
   generating a data structure associating the first content item with the second content item.

14. The system of claim 13, wherein generating the data structure comprises generating the data structure including a content item linking index.

15. The system of claim 13, wherein the program instructions are further executable by the processor to cause:
determining a first set of subjects associated with the first content item;
determining a second set of subjects associated with the second content item; and
determining that the first storyline is different from the second storyline by determining that the first set of subjects is different than the second set of subjects.

16. The system of claim 13, wherein the program instructions are further executable by the processor to cause:
receiving a request to present the first content item;
causing presentation of primary content corresponding to the first content item; and
causing presentation of linking content indicative of an association between the first content item and the second content item.

17. The system of claim 16, wherein causing presentation of the linking content indicative of the association between the first content item and the second content item comprises causing presentation of an interactive element that is user selectable to navigate to the second content item.

18. The system of claim 13, wherein determining the first subject of the first content item comprises indexing the first content item to determine one or more subjects of the first content item, and determining the first subject of the first content item from the one or more subjects based on keywords in the indexing.

19. The system of claim 13, wherein determining that the first subject is related to the second subject comprises determining that at least a portion of the first textual data and at least a portion of the second textual data have equal values for at least an amount exceeding a first threshold.

20. The system of claim 13, wherein the program instructions are further executable by the processor to cause:
   associating the first subject with the second subject using a subject linking index.

\* \* \* \* \*